(12) United States Patent
Sakoda et al.

(10) Patent No.: US 6,256,355 B1
(45) Date of Patent: Jul. 3, 2001

(54) TRANSMITTER, RECEIVER, COMMUNICATION METHOD AND RADIO COMMUNICATION SYSTEM

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/114,895

(22) Filed: Jul. 14, 1998

(30) Foreign Application Priority Data

Jul. 18, 1997 (JP) .................................................. 9-194171

(51) Int. Cl.[7] .................................................. H04L 27/00
(52) U.S. Cl. ........................... 375/259; 375/116; 714/758
(58) Field of Search ............................. 714/758; 375/259, 375/116

(56) References Cited

U.S. PATENT DOCUMENTS

| | | | | |
|---|---|---|---|---|
| 3,775,746 | * | 11/1973 | Boudreau et al. | 340/146 |
| 4,295,218 | * | 10/1981 | Tanner | 371/40 |
| 4,435,807 | * | 3/1984 | Scott et al. | 371/50 |
| 5,258,987 | * | 11/1993 | Wei | 371/43 |
| 5,367,544 | * | 11/1994 | Brueckheimer | 375/116 |
| 5,383,204 | * | 1/1995 | Gibbs et al. | 371/37.7 |
| 5,923,680 | * | 7/1999 | Brueckheimer et al. | 371/37.7 |

* cited by examiner

Primary Examiner—Stephen Chin
Assistant Examiner—Tony Al-Beshrawi
(74) Attorney, Agent, or Firm—Jay H. Maioli

(57) ABSTRACT

A received symbol sequence is very accurately restored in a highly efficient manner with a simple configuration, wherein, respective bits of an information bit sequence are inputted to a cyclic register composed of the same number of registers as the number of bits of the information bit sequence. Signals read from the cyclic register are processed to generate a plurality of symbols. The processing is repeated each time the respective bits of the information bit sequences are shifted to the next registers, until the respective bits shift all over the registers for one cycle. All symbols generated by the process are transmitted as a symbol sequence. Symbols of a received symbol sequence are respectively inputted to a first register group composed of the same number of registers as the number of symbols of the symbol sequence. Respective symbols in each of a plurality of assumed symbol sequences, prepared in accordance with the number of bits of the information bit sequence are inputted to a second register group composed of the same number of registers as the number of registers in the first register group. Respective output signals read from the respective registers in the first and second register groups are processed to calculate correlation values, and the information bit sequence is restored based on the assumed symbol sequence from which the largest correlation value is derived.

15 Claims, 7 Drawing Sheets

TRANSMITTER, RECEIVER, COMMUNICATION METHOD AND RADIO COMMUNICATION SYSTEM

BACKGROUND OF THE INVENTION

1. Field of the Invention

This invention relates to a transmitter, a receiver, a communication method and a radio communication system which are suitably applied to, for example, a portable telephone system in which Identification (ID) information of mobile stations is transmitted and received.

2. Description of the Related Art

Conventionally, in this type of radio communication systems, an area to which a communication system is provided is divided into cells of a desired size, and a base station is installed in each of the cells as a stationary radio station such that a portable telephone as a mobile station radio-communicates with a base station in a cell where the portable telephone exists. This radio communication system comprises, for example, portable telephones and base stations in a portable telephone system, wherein each of the portable telephones and the base stations is equipped with a transmitter and a receiver which are used for communications from a portable telephone to a base station as well as communications from a base station to a portable telephone.

In this event, when a radio communication between a portable telephone and a base station is made in accordance with a predetermined communication scheme, a transmitter side encodes an information bit sequence to be transmitted, modulates it in accordance with a predetermined scheme to generate an encoded symbol sequence, and transmits the encoded bit sequence through a predetermined transmission line as a transmission symbol sequence. In case that any symbol errors occur on the transmission line by any reason, a receiver side detects such errors in a received reception symbol sequence and then corrects the errors in accordance with a predetermined scheme to restore a correct information bit sequence.

For performing error detection and correction, for example, in a portable telephone system, error correcting redundancy bits, such as Cyclic Redundancy Check (CRC), Bose Chaudhuri Hocquenghem code (BCH), Reed Solomon code (RS-Code), or the like are added for the transmission of relatively short information bit sequences of several bits. Specifically, several bits of redundancy bits are added to a short information bit sequence of several bits in the transmitter to increase the distance between bit information (bit sequences). In this way, even if symbol errors occur in the process of transmission through a transmission line, since the distance between the bit sequences is extended, a receiver can correct errors in received reception symbol sequences up to several bits and restore the information bit sequence. Hence, an error ratio is reduced.

In this connection, the distance between bit sequences is defined by the number of bits having different values between a bit sequence $W_0$ and a bit sequence $W_1$, where the bit sequence $W_0$ is derived by adding several bits of redundancy bits to a relatively short information bit sequence of several bits, and the bit sequence $W_1$ is corrupted from the bit sequence $W_0$ due to errors which may occur in the transmission through a transmission line.

In this event, the receiver is configured to decode information bit sequences by treating reception symbol sequences as a group of binary signals having a value "0" or a value "1." Such an approach is generally called "hard determination decoding." However, since an actual receiver does not receive symbol sequences as binary signals each having "0" or "1." the receiver sets a certain value as a threshold such that the receiver determines whether each value of symbols in the reception symbol sequences is "0" or "1" after comparing each value with the threshold.

In such a processing step, if the value of each symbol in a reception symbol sequence is close to the threshold, a very subtle determination should be made as to whether the value of each symbol is regarded as "0" or "1." On the other hand, a reception symbol sequence also includes symbols having values which can be apparently determined to be "0" (or "1"). However, in the reception side, since the decoding is performed on reception symbol sequences after the determination of each symbol value being "0" or "1," symbols requiring subtle determination and apparently determinable symbols are uniformly treated. It is therefore hard to say that a highly accurate error correction is implemented.

On the contrary, another approach called "soft determination decoding" has been proposed. This approach employs convolutional encoding and Viterbi decoding to determine reception symbol sequences as multi-value signals for identification and restore information bit sequences. For example, a transmission symbol sequence generated by convolutional encoding an information bit sequence to be transmitted by an encoder in the transmission side is received and decoded as a reception symbol sequence by a Viterbi decoder in the reception side. In this event, since the Viterbi decoder receives, as an input reception symbol sequence, the values of the reception symbol sequence as they are, symbols unclearly determined to be "0" or "1" are distinguished from symbols clearly determined to be "0" or "1." Therefore, in all likelihood sequence estimation can be performed with high precision in general.

The convolutional encoding and the Viterbi decoding are generally used for transmission and reception of relatively long information bit sequences typically ranging from approximately 50 to 100 bits, and are not often used for transmission and reception of short information bit sequences. However, even when the convolutional encoding and Viterbi decoding are used for transmission and reception of short information bit sequences, in all likelihood sequence estimation can be performed with high precision in the reception side by adding tail bits to an information bit sequence to be transmitted in the transmitter side to increase the distance between bit sequences.

Actually, when a long information bit sequence is convolutional encoded for transmission in the transmission side, and Viterbi decoded in the reception side, the proportion of added tail bits is smaller as the information bit sequence is longer so that adverse effects due to the addition of tail bits are not necessary to consider seriously. However, in case that a short information bit sequence such as ID information of a portable telephone is convolutional encoded for transmission and Viterbi decoded in the reception side, that is, the information bit sequence to be transmitted includes merely several bits, since the information bit sequence is convolutional encoded together with the tail bits added thereto, the number of symbols of the symbol sequence is further increased. As a result, a problem arises in that a longer time is required for decoding the symbol sequence in the reception side.

SUMMARY OF THE INVENTION

In view of the foregoing, an object of this invention is to provide a transmitter, a receiver, a communication method and a radio communication system in which, reception symbol sequences can be efficiently restored with high accuracy with a simple configuration.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
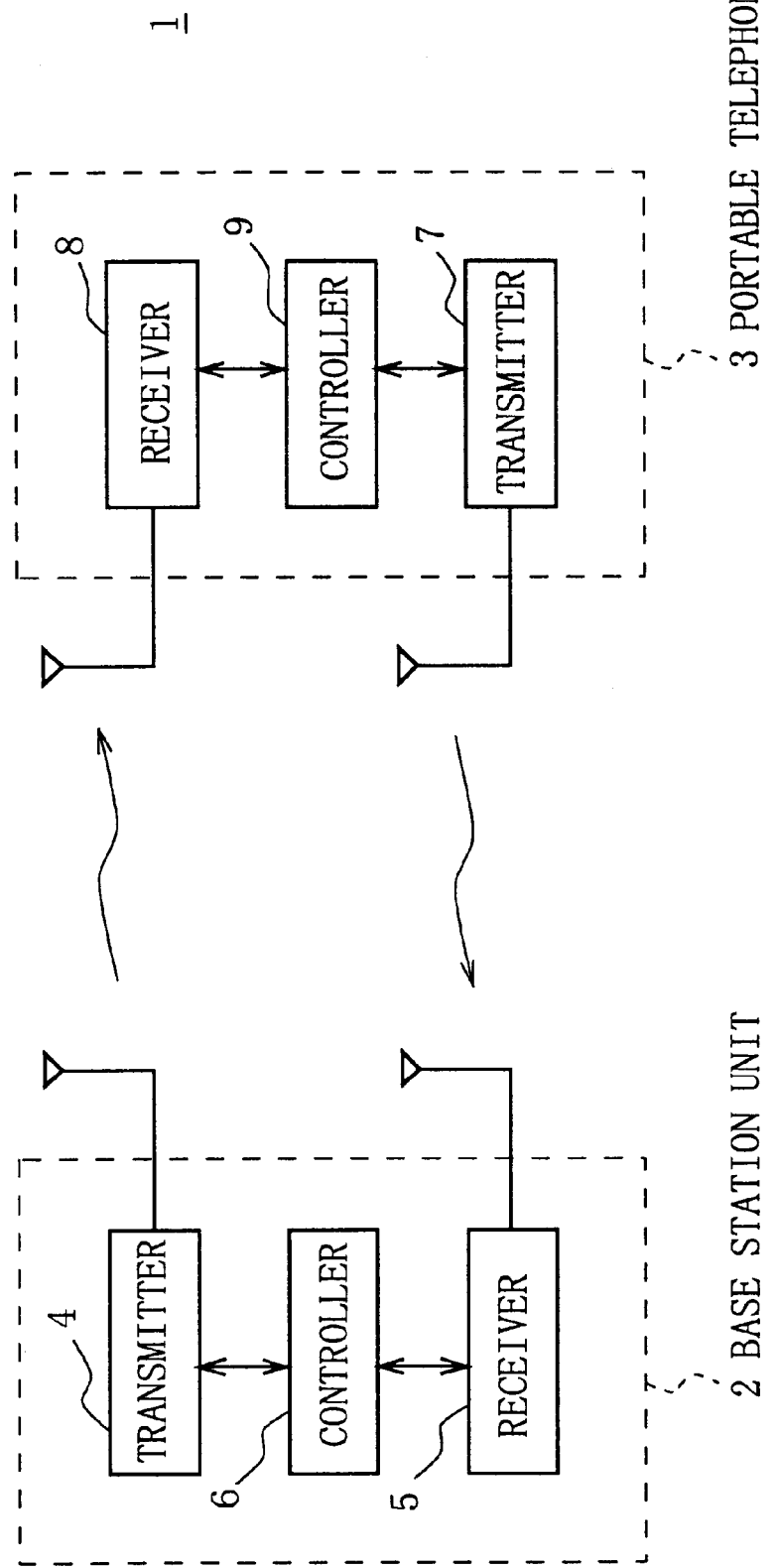
FIG. 1 is a block diagram illustrating a general configuration of a portable telephone system according to an embodiment of this invention.

Preferred embodiments of this invention will be described with reference to the accompanying drawings:
(1) General Configuration of Portable Telephone System In FIG. 1, a portable telephone system, generally designated by reference numeral 1 as a radio communication system, includes a base station unit 2 installed in each of cells divided with an area in which communication services are provided; and a portable telephone 3 which acts as a mobile unit for communicating with the base station unit 2.

The base station unit 2 is composed of a transmitter 4 for encoding an information bit sequence to generate a transmission symbol sequence and transmitting the transmission symbol sequence to the portable telephone 3 using a predetermined frequency channel; a receiver 5 for receiving a transmission symbol sequence transmitted from the portable telephone 3 using a predetermined frequency channel; and a controller 6 for controlling operations of the transmitter 4 and the receiver 5 as well as for managing a frequency channel used for communications with the portable telephone 3.

In the same way, the portable telephone 3 is composed of a transmitter 7 for encoding an information bit sequence to generate a transmission symbol sequence and transmitting the transmission symbol sequence to the base station unit 2 using a predetermined frequency channel; a receiver 8 for receiving a transmission symbol sequence transmitted from the base station unit 2 using a predetermined frequency channel; and a controller 9 for controlling operations of the transmitter 7 and the receiver 8 as well as for managing frequency channels used for communications with the base station unit 2.

In this portable telephone system 1, a plurality of frequency channels are provided for use in communications between the base station unit 2 and the portable telephone 3 such that an arbitrary pair of frequency channels are selected therefrom for communications from the base station unit 2 to the portable telephone 3 and for communications from the portable telephone 3 to the base station unit 2. In this event, each frequency channel is composed of, for example, 24 sub-carriers to perform so-called-a-multi-carrier communication in which a symbol sequence to be transmitted is distributed to the sub-carriers for multiplexing in communication.

For the multi-carrier communication, in this portable telephone system 1, a symbol sequence to be transmitted is segmented in slots, and the transmission symbol sequence segmented in slots are distributed to the above-mentioned sub-carriers for multiplexing. Also, this portable telephone system 1 is adapted to perform so-called frequency hopping, that is, a frequency channel used for each slot (for every one-modulation time) is randomly changed based on a predetermined pattern, so that interfering waves received from other communications can be reduced.

For beginning a communication, the portable telephone 3 first transmits a message for requesting the assignment of a control channel or an information channel to the base station 2 via the transmitter 7 through a random access channel. Actually, since the assignment of an information channel requires a variety of information to be exchanged between the base station unit 2 and the portable telephone 3, this information exchange is performed on a random access channel or a control channel. In this embodiment, assume that the exchanges of detailed information for the assignment of an information channel are performed on a control channel, and a random access channel is used for assigning the control channel.

In this case, when a base station unit 2 is to assign a control channel for a communication with a portable telephone 3, minimally required information is ID information of the portable telephone 3 indicating to which portable telephone 3 a control channel is assigned. Therefore, when a portable telephone 3 requests the assignment of a control channel to the base station unit 2, the portable telephone 3 must notify the base station unit 2 of its ID information on a random access channel.

In this connection, as the ID information of the portable telephone 3 had a length of 30 bits, the transmitter 7 should inherently transmit all 30 bits of the ID information to the base station unit 2. However, in this embodiment, assume that only lower nine bits of the 30 bits are transmitted. In this case, the transmission of only lower nine bits may cause the base station unit 2 to erroneously identify another portable telephone 3 therefrom, the probability of the erroneous identification is $\frac{1}{2}^9$ which can be regarded as being negligibly small.

Specifically, for notifying the base station unit 2 of its ID information (nine bits) as an information bit sequence, the transmitter 7 of the portable telephone 3 encodes the ID information to generate a transmission symbol sequence, modulates the transmission symbol sequence, and transmits the modulated transmission symbol sequence using a random access channel. The base station 2 sequentially hears random access channels, and starts processing a received reception symbol sequence when determining that the transmission symbol sequence has been received.

Subsequently, the base station unit 2 decodes the reception symbol sequence received with the receiver 5 to restore and read the ID information, and transmits a message for assigning a control channel to the portable telephone 3 having the ID information. This message stores the received ID information of the portable telephone 3 and information of a control channel to be assigned. Therefore, the portable telephone 3, upon receiving this message, proceeds to a mode in which a control signal is transmitted and received on the control channel assigned by the message, to perform transactions such as authentication/services on this control channel.

Now, the transmitters 4, 7 and the receivers 5, 8 respectively equipped in the base station unit 2 and the portable telephone 3, will be described below in a specific manner. However, since the transmitter 4 and the transmitter 7 have the same circuit configuration, and the receiver 5 and the receiver 8 also have the same circuit configuration, only the transmitter 7 equipped in the portable telephone 3 and the receiver 5 equipped in the base station unit 2 will be described here, with descriptions on the transmitter 4 and the receiver 8 being omitted.

(2) First Embodiment (2-1) Configuration of Transmitter

Figure 2:
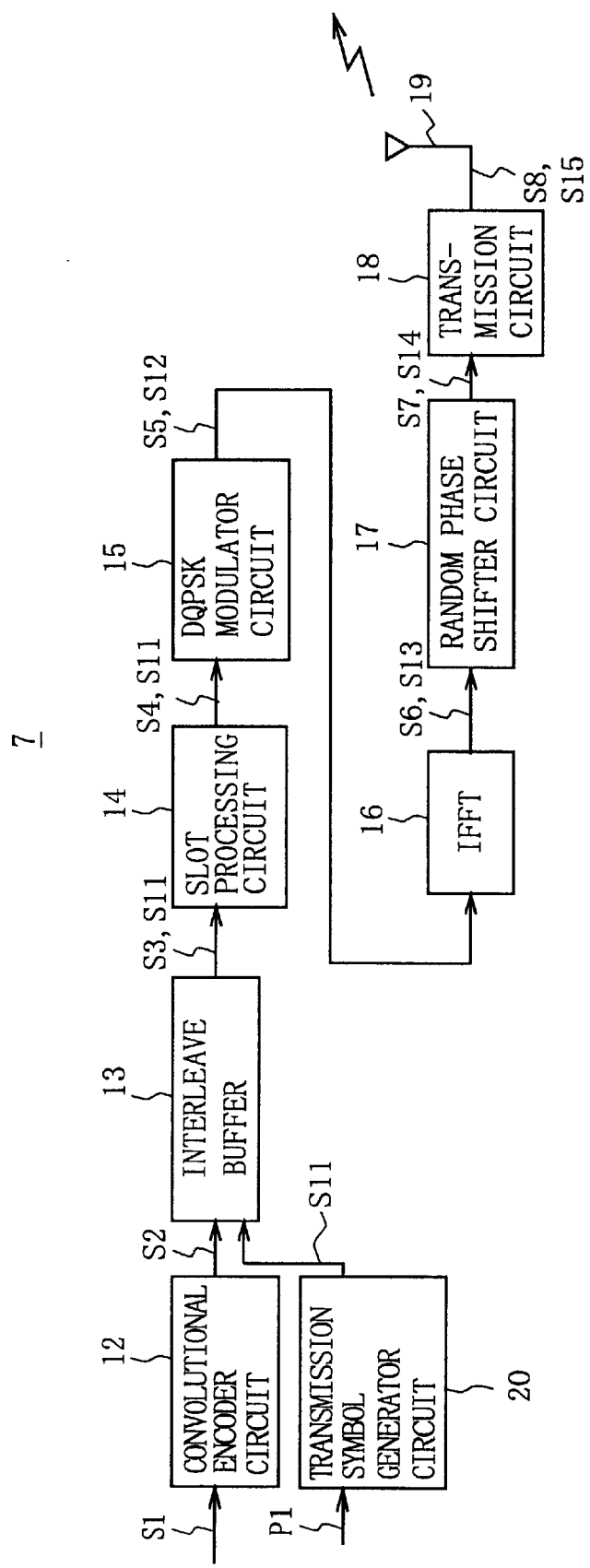
FIG. 2 is a block diagram illustrating the configuration of a transmitter according to a first embodiment of this invention.

As illustrated in FIG. 2, the transmitter 7 is generally composed of a convolutional encoder circuit 12; an interleave buffer 13; a slot processing circuit 14; a Differential Quadrature Phase Shift Keying (DQPSK) modulator circuit 15; an inverse fast Fourier transform (IFFT) circuit 16; a random phase shifter circuit 17; a transmission circuit 18; an antenna 19; and a transmission symbol generator circuit 20. First, for notifying the base station unit 2 of ID information P1 (nine bits) of the portable telephone 3 through a random access channel, the ID information P1 is inputted to the transmission symbol generator circuit 20.

The transmission symbol generator circuit 20 generates a transmission symbol sequence S11 by encoding based on the ID information P1 and sends the transmission symbol sequence S11 to the DQPSK modulator circuit 15 via the interleave buffer 13 and the slot processing circuit 14. The DQPSK modulator circuit 15 performs DQPSK modulation on the transmission symbol sequence S11 to generate a transmission signal S12 in which symbol information is represented by phase values, and sends it to the inverse fast Fourier transform circuit 16.

The inverse fast Fourier transform circuit 16 executes inverse Fourier transform processing to multiplex the symbol information of the transmission signal S12 on phase differences of a plurality of carriers having frequencies at predetermined intervals, and sends a transmission signal S13 comprising the plurality of carriers to the random phase shifter circuit 17. The random phase shifter circuit 17 adds random phase values generated according to a predetermined rule based on an initial phase value to the phases of the plurality of carriers forming the transmission signal S13 to randomize the phase values of the plurality of carriers, and supplies a resultant transmission signal S14 to the transmission circuit 18.

The transmission circuit 18 applies predetermined processing to the transmission signal S14, and then applies frequency conversion processing to the transmission signal S14 to convert it to a transmission signal S15 on a predetermined frequency channel, and transmits the transmission signal S15 through the antenna 19.

Afterward, as the portable telephone 3 proceeds to a telephone call state, the transmitter 7 inputs audio data S1 to the convolutional encoder circuit 12. The convolutional encoder circuit 12, which comprises shift registers arranged in a predetermined number of stages and an exclusive-OR circuit, convolutional encodes the inputted audio data S1, and sends resultant transmission symbols S2 to the interleave buffer 13.

The interleave buffer 13 stores the transmission symbols S2 within an internal storage region successively. When the entire storage region is filled with the transmission symbols S2 (when a desired amount of transmission symbols S2 have been accumulated), the interleave buffer 13 randomly rearranges the order of the transmission symbols S2 (hereinafter, this rearrangement of the order is referred to as "interleaving"), and sends the resultant transmission symbols S3 to the slot processing circuit 14. In this connection, the interleave buffer 13 has a storage capacity which corresponds to a plurality of slots so that the transmission symbols should be distributed to a large number of transmission slots.

The slot processing circuit 14 segments the transmission symbols S3 in slots for assigning the transmission symbols S3 to transmission slots, and sequentially outputs segmented transmission symbols S4 in slots to the DQPSK modulator circuit 15. The DQPSK modulator circuit 15 performs DQPSK modulation on the transmission symbols S4 supplied thereto in slots to generate a transmission signal S5 having symbol information represented by phase values, and sends the transmission signal S5 to the inverse fast Fourier circuit 16.

The inverse fast Fourier transform circuit 16 executes inverse Fourier transform processing to multiplex the symbol information of the transmission signal S5 on phase differences of a plurality of carriers having frequencies at predetermined intervals, and sends a transmission signal S6 comprising the plurality of carriers to the random phase shifter circuit 17. The random phase shifter circuit 17 adds random phase values generated according to a predetermined rule based on an initial phase value to the phases of the plurality of carriers forming the transmission signal S6 to randomize the phase values of the plurality of carriers, and supplies a resultant transmission signal S7 to the transmission circuit 18.

The transmission circuit 18 applies predetermined processing to the transmission signal S7, and then applies frequency conversion processing to the transmission signal S7 to convert it to a transmission signal S8 on a predetermined frequency channel, and transmits the transmission signal S8 through the antenna 19. For reference, in this portable telephone system 1, the transmission circuit 18 randomly changes the frequency channel of the transmission signal S8 at every predetermined timing to perform so-called the frequency hopping.

(2-2) Configuration of Receiver

Figure 3:
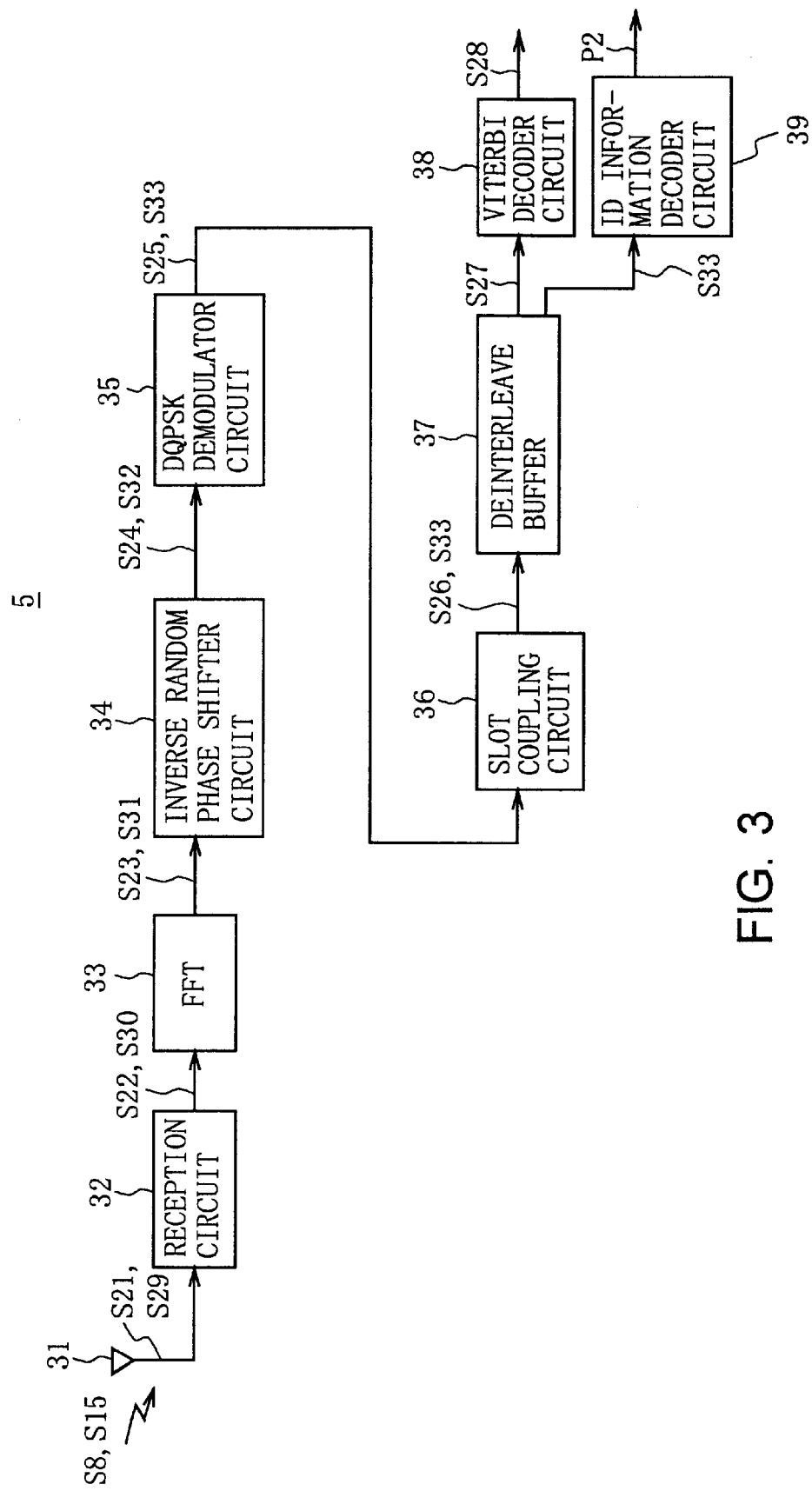
FIG. 3 is a block diagram illustrating the configuration of a receiver according to the first embodiment of this invention.

The receiver 5, as illustrated in FIG. 3, is generally composed of an antenna 31; a reception circuit 32; a fast Fourier transform (FFT) circuit 33; an inverse random phase shifter circuit 34; a DQPSK demodulator circuit 35; a slot coupling circuit 36; a deinterleave buffer 37; a Viterbi decoder circuit 38; and an ID information decoder circuit 39. A transmission signal S15 transmitted thereto from the transmitter 7 is received at the antenna 31, and inputted to the reception circuit 32 as a reception signal S29.

The reception circuit 32 amplifies the inputted reception signal S29 to a predetermined level, and then performs frequency conversion on the amplified reception signal S29 to extract a baseband signal S30, and sends the baseband signal S30 to the fast Fourier transform circuit 33. The fast Fourier transform circuit 33 performs Fourier transform to extract symbol information which is represented by phase information multiplexed on a plurality of carriers, and sends the extracted symbol information to the inverse random phase shifter circuit 34 as a reception signal S31.

The inverse random phase shifter circuit 34 restores phase states of the reception signal S31 to the original state using the same phase values as those used on the transmission side, and sends the resultant reception signal S32 to the DQPSK demodulator circuit 35. The DQPSK demodulator circuit 35 performs DQPSK demodulation on the reception signal S32 to extract symbol information, and sends the extracted symbol information to the ID information decoder circuit 39 as a reception symbol sequence S33 via the slot coupling circuit 36 and the deinterleave buffer 37. Besides, as this reception symbol sequence S33 is added noise components flow through a transmission line, it is not binary signals of "0" or "1," but is signals including error components.

The ID information decoder circuit 39 has prepared $2^9$ previously assumed bit sequences in accordance with the number of bits of the ID information P1 (nine bits) as assumed symbol sequences, in order to calculate correlation values for the reception symbol sequence S33. The ID information decoder circuit 39 calculates respective correlation values between each of all the prepared assumed symbol sequences and the reception symbol sequence S33, restores ID information P2 indicating the transmitted ID information P1, based on the assumed symbol sequence from which the largest correlation value is derived, and outputs the thus restored ID information P2.

Subsequently, when proceeding to a telephone call state, the receiver 5 amplifies a reception signal S21 to a predetermined level with the reception circuit 32, then performs frequency conversion on the reception signal S21 to extract a baseband signal S22, and sends this baseband signal S22 to the fast Fourier transform circuit 33. The fast Fourier transform circuit 33 performs Fourier transform to extract symbol information which is represented by phase information multiplexed on a plurality of carriers, and sends this symbol information to the inverse random phase shifter circuit 34 as a reception signal S23.

The inverse random phase shifter circuit 34 restores a phase state of the reception signal S23 to the original state using the same phase values as those used on the transmission side, and sends the resultant reception signal S24 to the DQPSK demodulator circuit 35. The DQPSK demodulator circuit 35 performs DQPSK demodulation on the reception signal S24 to extract symbol information, and sends the extracted symbol information to the slot coupling circuit 36 as a reception symbol sequence S25.

The slot coupling circuit 36 is a circuit for coupling the fragmentally supplied reception symbol sequence S25, which is segmented in slots, to assemble a continuous signal. When the reception symbol sequence S25 has been accumulated by an amount equaling to the storage capacity of the deinterleave buffer 37 at the subsequent stage, the slot coupling circuit 36 couples segments of the reception symbol sequence S25, and sends the coupled reception symbol sequence to the deinterleave buffer 37 as a reception symbol sequence S26.

The deinterleave buffer 37 has a storage capacity corresponding to a plurality of slots. After storing the supplied reception symbol sequence S26 sequentially in an internal storage region, the deinterleave buffer 37 rearranges the order of the reception symbol sequence S26 in the inverse procedure of rearrangement previously performed in the interleave buffer 13 of the transmitter 7, so as to return the reception symbol sequence S26 in the original order (hereinafter, the processing for returning a reception symbol sequence to an original order is called "deinterleaving"), and sends a resultant reception symbol sequence S27 to the Viterbi decoder circuit 38.

The Viterbi decoder circuit 38, which comprises a soft determination Viterbi decoder circuit, assumes trellis of convoluted codes based on the inputted reception symbol sequence S27, estimates the most likely state from all possible state transitions as data to restore a received data S28 indicating transmitted data in all likelihood (performs so-called sequence estimation), and outputs the restored received data S28.

(2-3) Configuration of Transmission Symbol Generator Circuit

Figure 4:
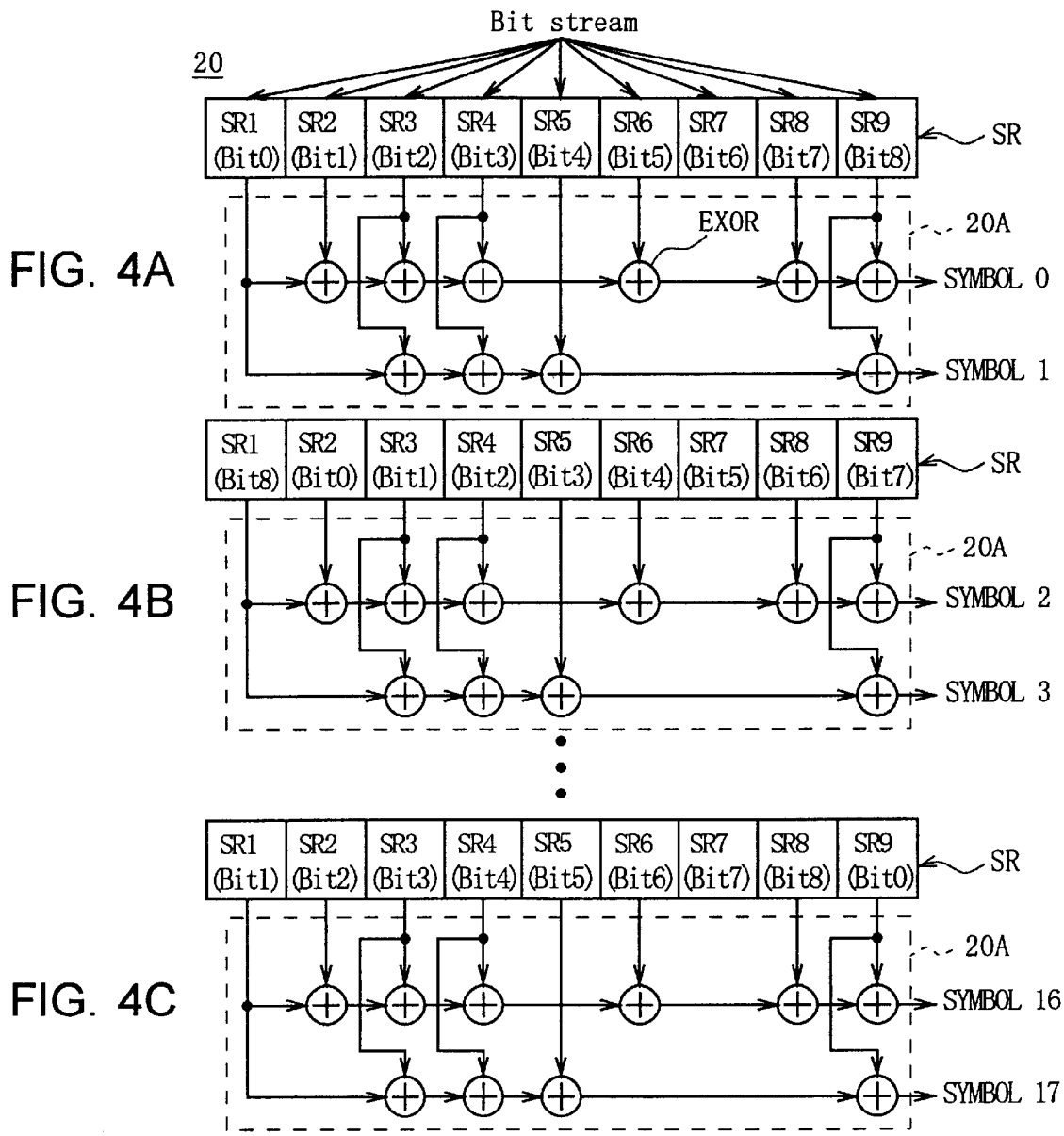
FIGS. 4A, 4B and 4C are block diagrams illustrating the configuration of a transmission symbol generator circuit according to the first embodiment of this invention.

Next, the transmission symbol generator circuit 20 will be described in detail with reference to FIG. 4. As illustrated in FIGS. 4A to 4C, the transmission symbol generator circuit 20 is composed of registers connected in a ring shape at the number of stages equaling to the number of bits of the ID information P1 to be transmitted (in this case, nine bits); a cyclic register SR for sequentially shifting each of inputted bits to the next register; and a processing unit 20A for processing outputs from the respective registers in the cyclic register SR. In this case, FIGS. 4A to 4C illustrate the same transmission symbol generator circuit 20 for representing a processing procedure for generating a transmission symbol sequence consisting of 18 symbols (18 bits).

First, as illustrated in FIG. 4A, the transmission symbol generator circuit 20 stores ID information P1 of nine bits (Bit0–Bit8) one bit at a time in the respective registers (SR1–SR9) of the cyclic register SR. And then, the transmission symbol generator circuit 20 cumulatively adds respective outputs of the registers SR1–SR4, SR6, SR8 and SR9 with respective exclusive OR (EXOR) circuits of the processing circuit 20A to generate a symbol 0, and cumulatively adds respective outputs of the registers SR1, SR3–SR5 and SR9 by respective exclusive OR (EXOR) circuits to generate a symbol 1.

Next, as illustrated in FIG. 4B, the transmission symbol generator circuit 20 shifts each bit to the next register on the right. Specifically, the bits are shifted bit by bit and stored in the next registers, such that "Bit8" is inputted to the register SR1; "Bit0" is inputted to SR 2; "Bit1" is inputted to SR3; and so on, up to the register SR9 in the same way. As described above, the outputs of the respective registers are cumulatively added with the respective EXOR circuits to generate a symbol 2 and a symbol 3.

In the same way, as illustrated in FIG. 4C, the transmission symbol generator circuit 20 sequentially inputs nine bits of the ID information P1 by shifting the respective bits (Bit0–Bit8) stage by stage until each bit shifts all over the registers (SR1–SR9) for one cycle, and cumulatively adds the outputs of the respective registers by the respective EXOR circuits as above to finally generate a symbol 16 and a symbol 17. In this way, the transmission symbol generator circuit 20 outputs the ID information P1 as an encoded bit sequence, namely a transmission symbol sequence S11 consisting of a total of 18 symbols.

As described above, the transmission symbol generator circuit 20, which has a cyclic register SR composed of the same number of registers as the number of bits of the ID information P1 to be transmitted, stores each bit of the information bit sequence in each of the registers SR at one time, and shifts the respective bits to the next registers stage by stage each time the processing is completed once. The bit shifting is repeated until each bit shifts all over the registers of the cyclic register SR for one cycle to generate the transmission symbol sequence S11 having an extended distance between bit sequences based on the ID information P1. Note that since the transmission symbol generator circuit 20 has no need to add tail bits to the transmission symbol sequence S11 for encoding it, the transmission symbol sequence S11 has a significantly reduced number of symbols as compared with a symbol sequence which is encoded by adding tail bits thereto, as is the case of using an ordinary convolutional encoder.

The transmission symbol sequence S11 consisting of 18 symbols (symbol 0 to symbol 17) generated by the transmission symbol generator circuit 20 is spatially transmitted with the transmission circuit 18 of the transmitter 7 as a transmission signal S15, which is then received by the receiver 5 and subjected to a most likelihood sequence estimation of soft determination by the ID information decoder circuit 39 as a reception symbol sequence S33.

(2-4) Configuration of ID information Decoder Circuit

Figure 5:
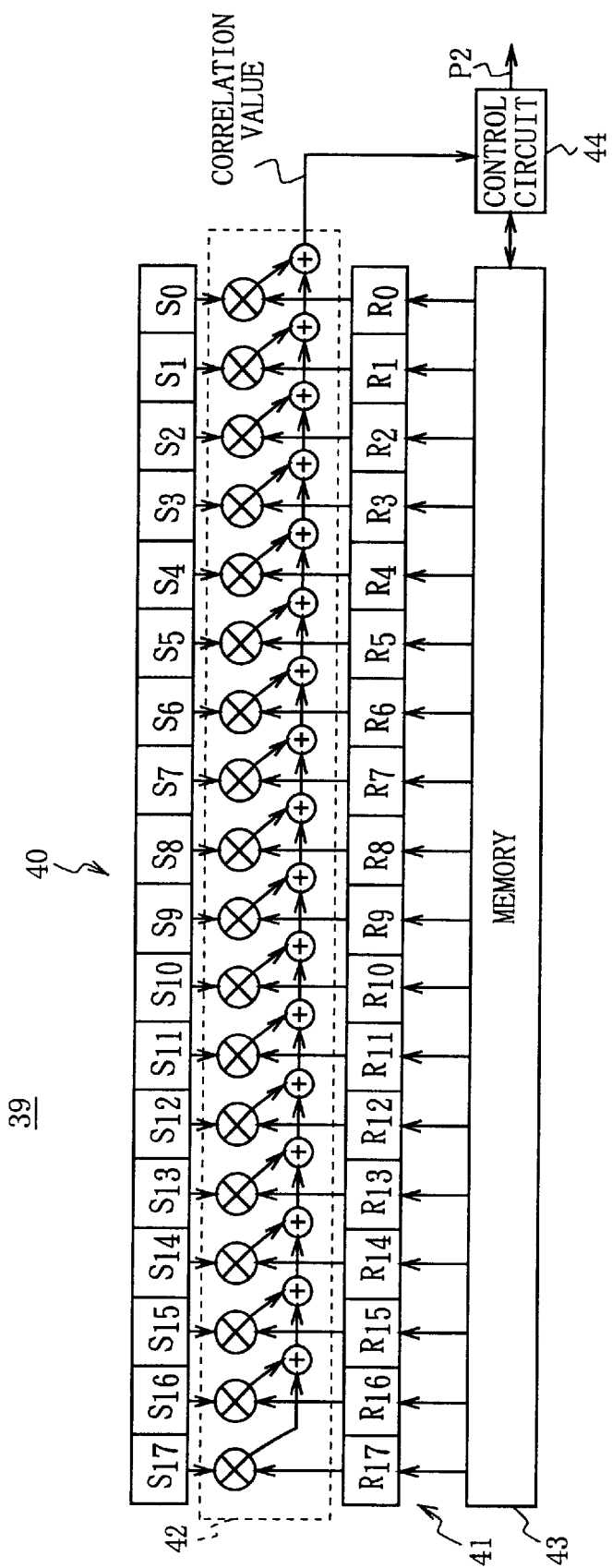
FIG. 5 is a block diagram illustrating the configuration of an ID information decoder circuit according to first and second embodiments of this invention.

In the following, the configuration of the ID information decoder circuit 39 will be described in detail with reference to FIG. 5. As illustrated in FIG. 5, the ID information decoder circuit 39 is composed of a register group 40 composed of the same number of registers as the number of symbols (18 symbols) of a reception symbol sequence S33; a memory 43 for storing $2^9$ assumed symbol sequences, previously prepared in accordance with the number of bits of the ID information P1 (nine bits) for calculating correlation values with the reception symbol sequence S33, as well as a plurality of assumed bit sequences corresponding to each of the assumed symbol sequences; a register group 41 comprising the same number of registers as the number of registers in the register group 40; a correlation value calculating circuit 42 for calculating respective correlation values based on respective output signals read from the register group 40 and the register group 41; and a control circuit 44 for reading each of complete assumed symbol sequences from the memory 43 to input respective symbols in each assumed symbol sequence to the respective registers in the register group 41, and for reading from the memory 43 an assumed bit sequence corresponding to the assumed symbol sequence from which the largest correlation value is derived within correlation values calculated by the correlation value calculating circuit 42 to output the read assumed bit sequence as the ID information P2.

Specifically, the ID information decoder circuit 39 calculates correlation values of the actually received reception symbol sequence S33 and each of the $2^9$ assumed symbol sequences, and outputs the ID information P2 which is restored based on the assumed symbol sequence providing the largest correlation value. For example, the largest correlation value means that the reception symbol sequence S33 inputted to the register group 40 substantially matches an assumed symbol sequence inputted to the register group 41. In that case, since "1" is calculated as "1" and "0" is calculate as "−1," the correlation value calculated by the correlation value calculating circuit 42 is the largest correlation value.

Conversely, a smaller correlation value means that the reception symbol sequence S33 hardly matches an assumed symbol sequence, in which case a correlation value calculated by the correlation value calculating circuit 42 is closer to "0." For reference, the correlation value indicates "18" when the received symbol sequence S33 completely matches an assumed symbol sequence, and the correlation value indicates "0" when all symbols in the received symbol sequence S33 are different from the assumed symbol sequence.

Thus, the ID information decoder circuit 39 is adjusted to read an assumed bit sequence corresponding to the assumed symbol sequence, from which the largest correlation value is derived, as the ID information P2 to restore the ID information P1.

(2-5) Operations and Effects in First Embodiment

With the above configuration, the transmission symbol generator circuit 20 inputs the ID information P1 bit by bit to the respective registers SR1–SR9 of the cyclic register SR comprising the same number of registers as the number of bits (nine bits) of the ID information P1, adds the outputs from the respective registers SR1–SR9 with the processing unit 20A to generate two symbols, and repeats this processing until all bits shift all over the respective registers for one cycle. Thereby, a transmission symbol sequence S11 consisting of 18 symbols can be generated. Since generating symbols by stage using the cyclic register SR at each time all bits are shifted, the transmission symbol generator circuit 20 has no need to add tail bits to an information bit sequence for encoding, as is the case of an ordinary convolutional encoder. Thus, when the ID information P1 is encoded, the transmission symbol sequence S11 having a reduced number of symbols with an extended distance between bit sequences can be generated.

When an information bit sequence is encoded in M-ARY modulation or the like, the distances between bit sequences are set to be the maximum because correlation values between respective bit sequences must be "0." For example, in the M-ARY modulation, when information of three bits is transmitted, a transmission symbol sequence consisting of $2^3$ symbols is generated for transmission. In another example, when information of nine bits is transmitted, a transmission symbol sequence consisting of $2^9$ symbols is generated for transmission.

Therefore, when a transmission symbol sequence encoded in the M-ARY modulation is received in the reception side to calculate correlation values with assumed symbol sequences previously prepared therein, a significantly larger correlation value is derived only for an assumed symbol sequence which matches the transmission symbol sequence, while correlation values with the remaining assumed symbol sequences are all "0." In this way, an assumed symbol sequence from which a large correlation value is derived can be readily extracted in the reception side to restore an information bit sequence based on the assumed symbol sequence.

In the ID information decoder circuit 39 of this invention, in contrast, correlation values of a reception symbol sequence S33 spatially transmitted thereto, and the remaining assumed symbol sequences which do not match the reception symbol sequence S33, need not be always "0." Since the ID information decoder circuit 39 simply outputs ID information P2 restored based on the assumed symbol sequence providing the largest correlation value, it is not necessary to generate transmission symbol sequences consisting of $2^n$ symbols when the transmission symbol generator circuit 20 encodes information of n bits.

The transmission symbol generator circuit 20 of this invention is only required to generate two symbols at a time by shifting all bits of the ID information P1 nine times, one stage per shift, and transmit a total of 18 symbols as a transmission symbol sequence S11, thus the number of transmitted bits can be largely reduced. On the contrary, since a conventional convolutional encoder requires the addition of tail bits for encoding an information bit sequence of nine bits, the number of symbols of a generated transmission symbol sequence is much larger than the number of symbols of the transmission symbol sequence S11 (18 symbols).

Since the transmission symbol generator circuit 20 largely reduces the number of symbols of the generated transmission symbol sequence S11 as described above, the bit ratio of the 9-bit ID information P1 to the 18-symbol transmission symbol sequence S11, i.e., the encoding ratio in a broad sense is ½ (9/18), thereby permitting highly efficient transmission of the transmission symbol sequence S11.

The transmission symbol sequence S11 consisting of a reduced number of symbols generated thus is spatially transmitted as a transmission signal S15, and inputted to the ID information decoder circuit 39 of the receiver 5 as a reception symbol sequence S33. And then, correlation values of the reception symbol sequence S33 with $2^9$ assumed symbol sequences previously prepared in the ID information decoder circuit 39 are calculated, and ID information P2 is outputted by restoring based on the assumed symbol sequence from which the largest correlation value is derived.

Figure 6:
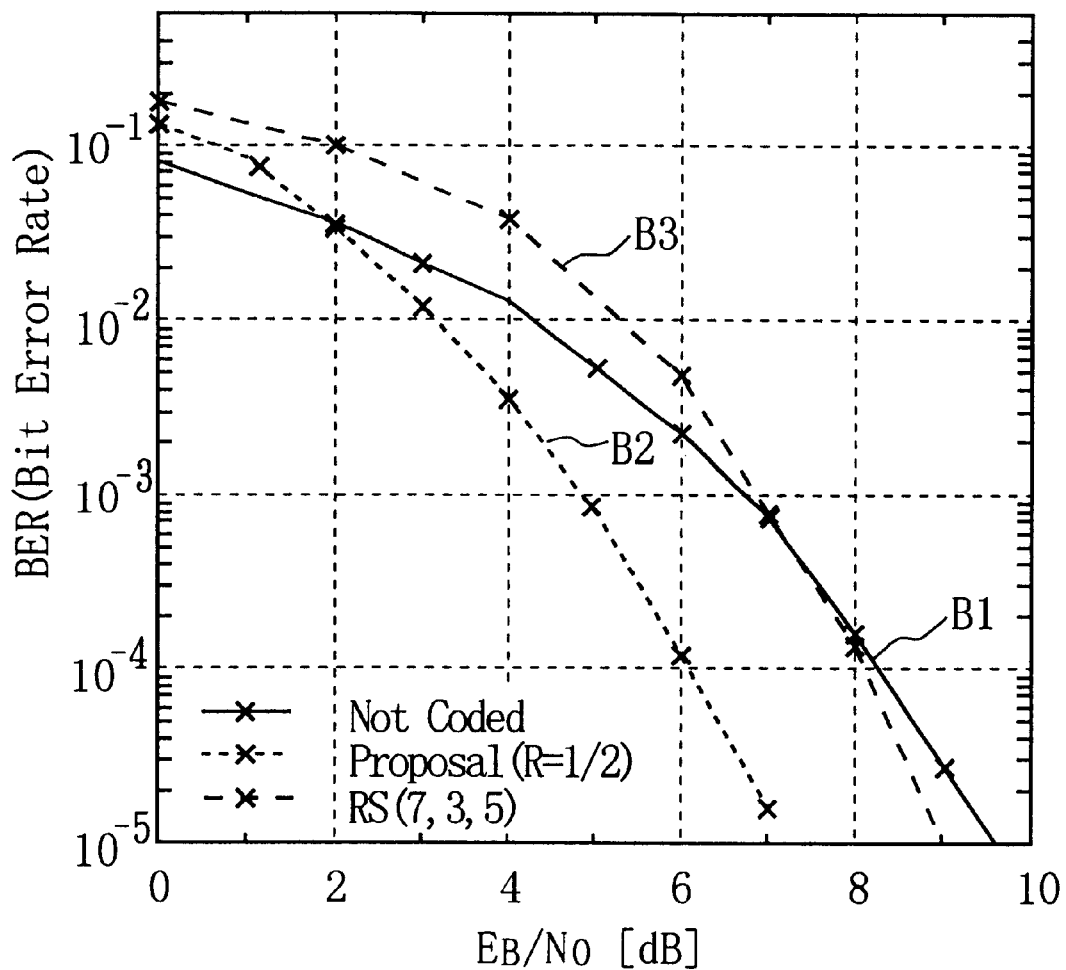
FIG. 6 is an evaluation graph indicating a simulation result of required $E_B/N_o$ according to the first embodiment of this invention.

FIG. 6 illustrates an evaluation graph for a required $E_B/N_o$ in an Additional White Gaussian Noise (AWGN) environment. In this evaluation graph, the ordinate represents a bit error rate or BER, and the abscissa represents $E_B/N_o$ dB indicating a power spectrum density ratio of energy required for transmitting one bit to a noise component. Specifically explaining, this evaluation graph is drawn to easily read $E_B/N_o$ dB when a reference bit error rate (BER) is known, and represents that information can be more accurately transmitted with less transmission energy as the bit error rate is higher and $E_B/N_o$ dB is smaller.

In the graph of FIG. 6, "Not Coded" indicated by a solid line represents a bit sequence B1 which is modulated without encoding an information bit sequence and is transmitted. "Proposal" indicated by a dotted line represents a symbol sequence B2 generated by the transmission symbol generator circuit of this invention configured as illustrated in FIG. 4 under condition that an encoding ratio (R) is equal to ½ and a constraint length is equal to 11. "RS (7, 3, 5)" indicated by a broken line represents a Reed Solomon code B3 having the number of symbols equaling to "7," the number of bits per symbol equaling to "3," and the distance between bit sequences equaling to "5."

In this case, the symbol sequence B2 represented by "Proposal" is encoded with 11 bits of information bits defined as one transmission unit to generate a transmission symbol sequence having a total of 22 symbols. On the other hand, the Reed Solomon code B3 is encoded with nine bits of information bits defined as one transmission unit to generate a bit sequence having a total of 21 bits, including 12 bits of redundancy bits added thereto.

Stated another way, the symbol sequence B2 has an encoding ratio, in a broad sense, equaling to ½ (11/22), whereas the Reed Solomon code B3 has an encoding ratio, in a broad sense, equaling to 3/7 (9/21), so that the encoding ratio of the symbol sequence B2 is higher than the encoding ratio of the Reed Solomon code B3. Generally, it is said that as the encoding ratio is lower, the value of $E_B/N_o$ dB is smaller, and less energy is required for transmitting one bit. In this case, since the encoding ratio of the Reed Solomon code B3 is lower than that of the symbol sequence B2, the Reed Solomon code B3 is transmitted under a slightly more advantageous condition.

For example, by showing that $E_B/N_o$ dB at a position at which BER indicates $10^{-3}$ is 4.8 dB with the symbol sequence B2; 6.8 dB with the bit sequence B1; and 7.0 dB with the Reed Solomon code B3, it is found that the symbol sequence B2 indicated by "Proposal" presents the lowest value. In the same way, by showing that $E_B/N_o$ dB at a position at which BER indicates $10^{-4}$ is 6.2 dB with the symbol sequence B2; 8.4 dB with the bit sequence B1; and 8.2 dB with the Reed Solomon code B3, it is found that the symbol sequence B2 indicated by "Proposal" presents the lowest value.

The evaluation graph points out that, as the symbol sequence B2 indicated by "Proposal" exhibits lower values of $E_B/N_o$ dB while having a higher encoding ratio than the Reed Solomon code B3, the transmission symbol sequence S11 generated by the transmission symbol generator circuit 20 of this invention is efficiently transmitted with the least transmission energy, and restored with high accuracy on the reception side.

According to the foregoing configuration, the transmitter 7 encodes ID information P1 (n bits) with the transmission symbol generator circuit 20 to generate a transmission symbol sequence S11 (2×n bits) consisting of a reduced number of bits and having an extended distance between bit sequences, as compared with an ordinary convolutional encoder which adds tail bits for encoding, thus the transmitter 7 can efficiently transmit the transmission symbol sequence S11 with less transmission energy. Also, the receiver 5 calculates correlation values of a received symbol sequence S33 with assumed symbol sequences with the ID information decoder circuit 39, and outputs ID information P2 restored based on the assumed symbol sequence with which the largest correlation value is calculated, thereby the receiver 5 can read the ID information P1 in a short time with high accuracy.

As described above, the portable telephone system 1 correctly read the encoded ID information P1 as the ID information P2 restored with the receiver 5, so that it can rapidly transmit a message for assigning a control channel to the portable telephone 3 having the ID information P1. The portable telephone 3, upon receiving the message, proceeds to a transmission/reception mode with a specified control channel, and can smoothly enter a telephone call state by performing transactions such as authentication/services for the portable telephone 3 using the control channel.

(3) Second Embodiment

In a second embodiment, ID information P1 of nine bits is encoded to generate a transmission symbol sequence S11 which is transmitted as a transmission signal S15 as is the case of the transmission symbol generator circuit 20 in the transmitter 7 (FIG. 2) of the first embodiment. This transmission signal S15 is received by a receiver 80 illustrated in FIG. 7, when it is spatially transmitted.

(3-1) Configuration of Receiver

Figure 7:
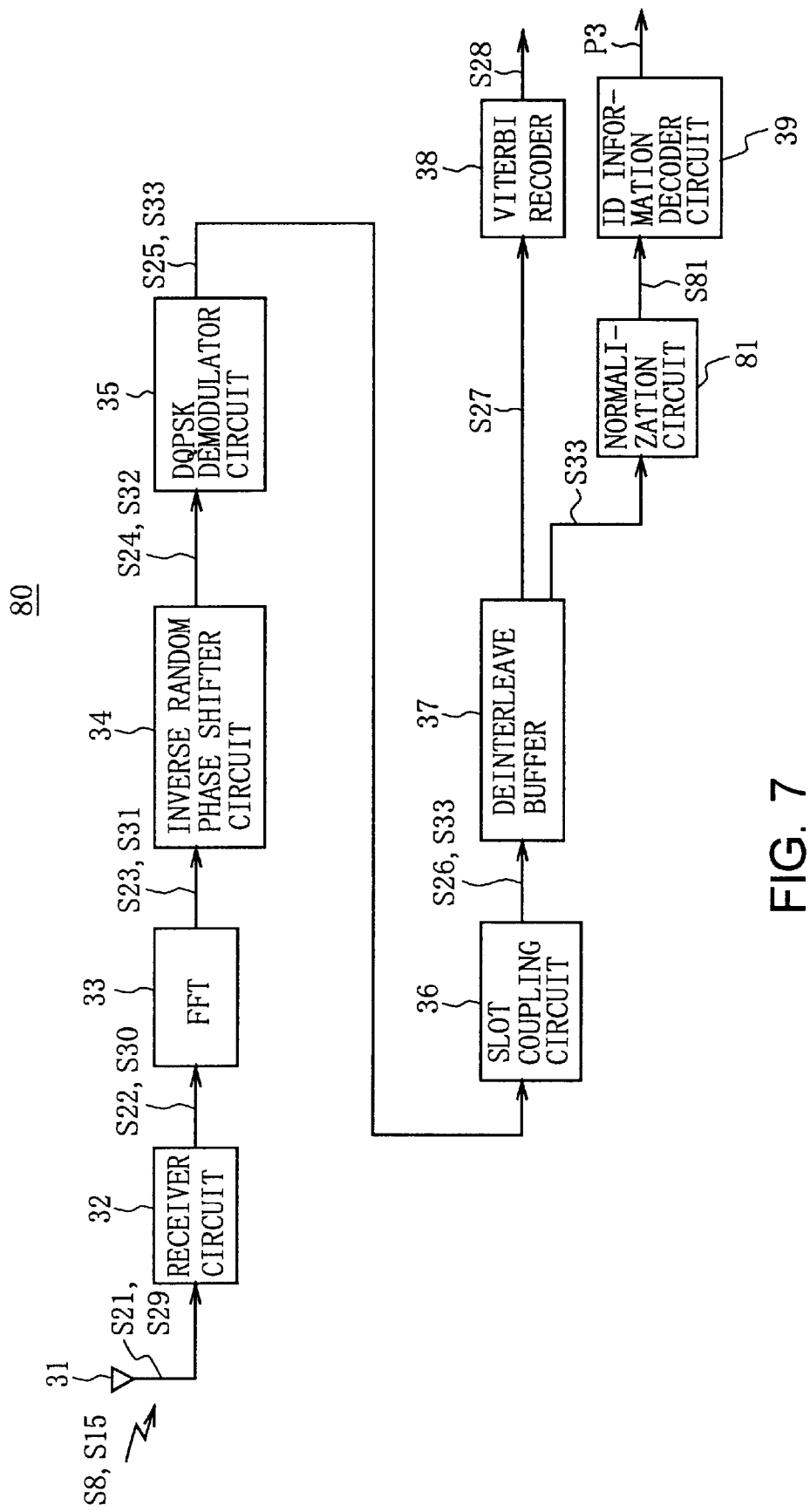
FIG. 7 is a block diagram illustrating the configuration of a receiver according to the second embodiment.

In FIG. 7 in which parts corresponding to those in FIG. 3 are designated by the same reference numerals, a receiver 80 is configured in a same manner as the receiver 5 of FIG. 3 except for a normalization circuit 81 which is newly provided between the deinterleave buffer 37 and the ID information decoder circuit 39. The receiver 80 inputs a reception signal S29 received through the antenna 31 to the normalization circuit 81 as a reception symbol sequence S33 via the slot coupling circuit 36 and the deinterleave buffer 37.

The normalization circuit 81 calculates total power for each of symbols of the reception symbol sequence S33, normalizes the respective total power by dividing the same by an effective amplitude (power), and sends the normalized reception symbol sequence S81 to the ID information decoder circuit 39. As the reception symbol sequence S33 is normalized by the normalization circuit 81, correlation values of the reception symbol sequence S81 with assumed symbol sequences can be correctly calculated without influences of the magnitude of the received power of the reception symbol sequence S33 in the ID information decoder circuit 39.

(3-2) Operations and Effects in Second Embodiment

In the above configuration, the ID information decoder circuit 39 calculates correlation values of a reception symbol sequence S81 with respective $2^9$ assumed symbol sequences previously prepared therein. In this event, the ID information decoder circuit 39 outputs ID information P3 restored based on a assumed symbol sequence which is used to calculate a correlation value C1 that satisfies the following expression.

$$NUM-C1<d/2 \quad (1)$$

$$C1-C2>d/2 \quad (2)$$

where C1 is the largest correlation value; C2 is the second largest correlation value; NUM is the number of symbols of the received reception symbol sequence S81 (in this case "18"); and d is a minimum free distance of the reception symbol sequence S81 (in this case "12") which is uniquely determined in the transmission symbol generator circuit 20 of this invention (coding ratio equaling to ½, and constraint length equaling to nine).

Here, "NUM-C1" on the left side of expression (1) is a first differential value indicating the degree of reliability of the correlation value. For example, the correlation value C1 indicates the largest value "18" when an assumed symbol sequence completely matches the reception symbol sequence S81, so that the first differential value "NUM-C1" is calculated as "18-18" i.e., "0." Thus, since a smaller first differential value "NUM-C1" indicates higher reliability of the correlation value, the reliability of the correlation value C1 is determined to have a high reliability when the first differential value is smaller than a predetermined reference value d/2.

In addition, "C1-C2" on the left side of expression (2) is a second differential value indicating the degree of reliability of the correlation value C1. For example, a larger difference between the correlation value C1 and the correlation value C2 indicates higher reliability of an estimation that an assumed symbol sequence used to calculate the correlation value C1 is a transmission symbol sequence S11. If the differential value is smaller, this indicates lower reliability of an estimation that the assumed symbol sequence used to calculate the correlation value C1 is the transmission symbol sequence S11. A sufficiently high reliability is determined when the second differential value is larger than the predetermined reference value d/2. Consequently, a highly reliable decoding result can be provided with the ID information decoder circuit 39 which outputs ID information P3 that is restored based on an assumed symbol sequence used to calculate the correlation value C1 which satisfies expression (1) and expression (2).

As described above, the ID information decoder circuit 39 in the second embodiment calculates total power for each of the symbols of the reception symbol sequence S33, normalizes the respective total power values by dividing the same by the effective amplitudes to generate the reception symbol sequence S81, calculates the correlation value C1 and the correlation value C2 of the normalized reception symbol sequence S81 with assumed symbol sequences, and outputs the ID information P3 which is restored based on an assumed symbol sequence used to calculate the correlation value C1 satisfying the expression (1) and expression (2), so that the ID information P1 can be restored more correctly.

According to the portable telephone system 1 configured as described above, the base station unit 2 reads ID information P3 correctly restored with the ID information decoder circuit 39 of the receiver 5 in a short time as the ID information P1, so that the base station unit 2 can rapidly transmit a message for assigning a control channel to a portable telephone 3. Therefore, the portable telephone 3, upon receiving the message, can proceed to a control signal transmission/reception mode on a control channel specified by the message, and performs transactions of authentication/services for the portable telephone 3 using the control channel to smoothly enter a telephone call state.

(4) Other Embodiments

The above first and second embodiments have been described in connection with the use of the transmission symbol generator circuit 20 comprising the cyclic register SR and the processing unit 20A, with an encoding ratio equaling to ½ and a constraint length equaling to nine, as a processing means. However, this invention is not limited thereto, but may employ other transmission symbol generator circuits in a variety of configurations and with varying encoding ratios and constraint lengths, as long as a transmission symbol generator circuit has a cyclic register composed of the same number of registers as the number of bits of ID information P1 to be encoded and can perform necessary processing by shifting respective bits in the ID information P1 until the respective bits shift all over the registers for one cycle. In this case, the same effects as those of the above first and second embodiments can be also achieved.

Moreover, the above first and second embodiments have been described for a case where only lower nine bits of ID information P1, as identification information, are encoded by the transmission symbol generator circuit 20 and transmitted. However, this invention is not limited thereto. Alternatively, when ID information P1 has a bit length less than 20 bits, all bits may be encoded and transmitted. In addition, when the base station unit 2 can recognize the ID information P1 of a particular portable telephone 3 without confusion, a further reduced number of lower bits of the ID information P1 may be transmitted.

For example, when lower 5 bits of the ID information P1 is encoded and transmitted, an information bit sequence added 4 bits of redundancy bits such as CRC, BCH or the like is encoded by the transmission symbol generator circuit 20 to generate a transmission symbol sequence S11. ID information P2 and P3 are decoded based on the assumed symbol sequence used to derive the largest correlation value by the ID information decoder circuit 39 of the receiver 5, and the decoded ID information P2 and P3 may be further subjected to error detection by a CRC detector circuit. In this case, even if the ID information P2 and P3 decoded by the ID information decoder circuit 39 of the receiver 5 is erroneous, errors can be detected by the CRC detector circuit, so that the reliability of the ID information P2 and P3 which are determined to be correct via the CRC detector circuit should be further improved.

Moreover, the above first and second embodiments have been described in connection with the use of the ID information decoder circuit 39 (FIG. 5) comprising the correlation value calculating circuit 42 as correlation value calculating means; the memory 43 as data input means and decoding means; and the control circuit 44. However, this invention is not limited thereto, but may employ other ID information decoder circuits in a variety of configurations as long as it can calculate correlation values of a received symbol sequence S33 with assumed symbol sequences.

Moreover, the above second embodiment has been described for a case where the ID information decoder circuit 39 reads the ID information P3, which is restored based on an assumed bit sequence used to calculate a correlation value C1 satisfying expression (1) and expression (2), as the ID information P1. However, this invention is not limited thereto. Alternatively, the ID information decoder circuit 39 may output ID information P3 which is restored based on an assumed bit sequence used to calculate a correlation value C1 only satisfying expression (1). In this case, the receiver 5 can increase the processing speed in the ID information decoder circuit 39.

Moreover, the above first and second embodiments have been described for the case where the portable telephone communication system 1 of this invention is applied to the portable telephone system 1 which performs multi-carrier communications, wherein the transmitter 7 transmits a transmission symbol sequence S11 as a transmission signal S15 with the transmitting means comprising components from the interleave buffer 13 to the antenna 19, and the receiver 5 receives a reception symbol sequence S29 with the receiving means comprising components from the antenna 31 to the deinterleave buffer 37. However, this invention is not limited thereto, but may be applied to any radio communication system in accordance with any other communication scheme employing transmitting means and receiving means conforming to any other scheme such as a Code Division Multiple Access (CDMA) scheme or the like.

According to this invention as described above, respective bits of an information bit sequence are inputted to respective registers of a cyclic register composed of the same number of registers as the number of bits of the information bit sequence. Signals read from the respective registers are processed in a predetermined combination to generate a plurality of symbols. The processing is repeated each time the respective bits of the information bit sequence are shifted to the next registers until the respective bits shift all over the registers for one cycle. All symbols generated by the processing are transmitted through a predetermined transmission line as a symbol sequence. When the symbol sequence is received, respective symbols of the symbol sequence are inputted to respective registers in a first register group comprising the same number of registers as the number of symbols of the symbol sequence. Respective symbols of an assumed symbol sequence, selected one by one from a plurality of assumed symbol sequences previously provided in accordance with the number of bits of the information bit sequence, are inputted to respective registers in a second register group comprising the same number of registers as the number of registers in the first register group. Respective output signals read from the respective registers in the first register group and the second register group are processed to calculate correlation values of the symbol sequence with the plurality of assumed symbol sequences. An information bit sequence is restored based on the assumed symbol sequence, from which the largest correlation value is derived within all correlation values. In this way, the information bit sequence can be restored with high accuracy in a shorter processing time as compared with the case where an information bit sequence is convolutional encoded on the transmission side, and Viterbi decoded on the reception side.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitter for transmitting a transmission symbol sequence generated by encoding an information bit sequence comprising:

a cyclic register comprising a number of registers equal to a part of a number of bits of communication ID information and being connected in a circular shape, wherein each of said bits of said part of said communication ID information is inputted to each of said registers and sequentially shifted to a next one of said registers; and processing means for processing signals read from said registers in a predetermined combination for generating a plurality of transmission symbols each time a part of said communication ID information is shifted to the next one of said registers, repeating said processing each time said bits of said part of the communication ID information are shifted to said next one of said registers, and outputting all of said transmission symbols as said transmission symbol sequence generated until said bits shift over all of said registers for one cycle.

2. The transmitter according to claim 1, wherein said information bit sequence includes an error detecting code.

3. A receiver comprising:

receiving means for receiving a transmission symbol sequence transmitted thereto, wherein a reception symbol sequence is generated by respectively inputting registers in a cyclic register formed of a first number of said registers equal to a number of said bits of said information bit sequence, respectively processing signals read from said registers in a predetermined combination for generating a plurality of reception symbols, repeating said processing each time said bits of said information bit sequence are shifted to a next one of said registers, and transmitting all of said reception symbols as said reception symbol sequence generated until said bits shift over all of said registers for one cycle;

a first register group including a second number of said registers equal to a number of said reception symbols of said reception symbol sequence, and said reception symbols of said reception symbol sequence are respectively inputted to said registers;

a second register group including a same number of said registers as said second number of said registers in said first register group;

data input means for respectively inputting assumed symbols of each of an assumed symbol sequence taken one by one from a plurality of assumed symbol sequences, said assumed symbol sequences prepared in accordance with said number of said bits of said information bit sequence, to said registers in said second register group;

correlation value calculating means for respectively processing output signals read from said registers in said first register group and said second register group for respectively calculating correlation values of said reception symbol sequence and said plurality of said assumed symbol sequences; and decoding means for restoring said information bit sequence based on said assumed symbol sequence wherefrom a largest correlation value of said correlation values is derived.

4. The receiver according to claim 3, comprising normalizing means for normalizing said reception symbol sequence received by said receiving means by calculating a total power of each of said reception symbols of said symbol reception sequence and dividing each said total power by an effective amplitude.

5. The receiver according to claim 4, wherein said data input means respectively inputs normalized symbols of said normalized symbol sequence to said registers in said first register group, and said decoding means restores said information bit sequence based on said assumed symbol sequence, wherefrom said largest correlation value is derived when a first differential value between a total number of said reception symbols of said reception symbol sequence and said largest correlation value calculated based on said normalized symbol sequence and said assumed symbol sequence is larger than a predetermined reference value.

6. The receiver according to claim 5, wherein said decoding means restores said information bit sequence based on said assumed symbol sequence, wherefrom said largest correlation value is derived, when said first differential value is larger than said predetermined reference value, and when a second differential value between said largest correlation value and a second largest correlation value is larger than said predetermined reference value.

7. A communication method comprising the steps of:
- inputting, respectively, bits of an information bit sequence to registers in a cyclic register including a first number of said registers equal to a number of bits of said information bit sequence;
- processing, respectively, signals read from said registers in a predetermined combination for generating a plurality of transmission symbols;
- repeating said processing each time said bits of said information bit sequence are shifted to a next one of said registers; and
- transmitting all of said transmission symbols as a transmission symbol sequence generated until said bits shift over all of said registers for one cycle through a predetermined transmission line;
- receiving said transmission symbol sequence;
- inputting, respectively, reception symbols of a reception symbol sequence to said registers in a first register group including a second number of said registers equal to a number of said reception symbols of said reception symbol sequence;
- inputting, respectively, assumed symbols of each of an assumed symbol sequence taken one by one from a plurality of assumed symbol sequences, said assumed symbol sequences prepared in accordance with said number of said bits of said information bit sequence, to said registers in a second register group including a same number of said registers as said second number of registers in said first register group;
- processing, respectively, output signals read from said registers in said first register group and said second register group for calculating correlation values of said reception symbol sequence and said plurality of said assumed symbol sequences; and
- restoring said information bit sequence based on said assumed symbol sequence wherefrom a largest correlation value of said correlation values is derived.

8. The communication method according to claim 7, further comprising the step of normalizing said reception symbol sequence by calculating a total power of each reception symbol of said reception symbol sequence and dividing each said total power by an effective amplitude, and respectively inputting normalized symbols in said normalized symbol sequence to said registers in said first register group.

9. The communication method according to claim 8, further comprising the step of restoring said information bit sequence based on said assumed symbol sequence, wherefrom said largest correlation value is derived when a first differential value between a total number of reception symbols of said reception symbol sequence and said largest correlation value calculated based on said normalized symbol sequence and said assumed symbol sequence is larger than a predetermined reference value.

10. The communication method according to claim 9, further comprising the step of restoring said information bit sequence based on said assumed symbol sequence, wherefrom said largest correlation value is derived, when said first differential value is larger than said predetermined reference value, and when a second differential value between said largest correlation value and a second largest correlation value is larger than said predetermined reference value.

11. A radio communication system for communicating between a mobile station unit and a base station unit, wherein said mobile station unit comprises:
- a cyclic register comprising a first number of registers equal to a number of bits of identification information connected in a circular shape, wherein each of said bits of said identification information is inputted to each of said registers said sequentially shifted to a next one of said registers;
- processing means for processing signals read from said registers in a predetermined combination for generating a plurality of transmission symbols, repeating said processing each time said bits of said identification information are shifted to said next one of said registers, and outputting all transmission symbols as a transmission symbol sequence generated until said bits shift over all of said registers for one cycle; and
- transmitting means for transmitting said transmission symbol sequence;
- a first register group including a second number of registers equal to a number of reception symbols of a reception symbol sequence, said reception symbols of said reception symbol sequence are respectively inputted to said registers;
- a second register group including a same number of said registers as said second number of registers in said first register group;
- data input means for respectively inputting assumed symbols of each of an assumed symbol sequence taken one by one from a plurality of assumed symbol sequences, said assumed symbol sequences being prepared in accordance with said number of bits of said identification information, to said registers in said second register group;
- correlation value calculating means for respectively processing output signals read from said registers in said first register group an said second register group for respectively calculating correlation values of said reception symbol sequence and said plurality of said assumed symbol sequences; and
- decoding means for restoring said identification information based on said assumed symbol sequence wherefrom a largest correlation value of said correlation values is derived.

12. The radio communication system according to claim 11, wherein said transmitting means multiplexes said transmission symbol sequence on a plurality of carriers at frequencies at predetermined intervals, and transmits a resultant multiplexed signal.

13. The radio communication system according to claim 11, wherein said base station unit further comprises normalizing means for normalizing said reception symbol sequence received from said receiving means by calculating a total power of each reception symbol of said reception symbol sequence and dividing each said total power by an effective amplitude.

14. The radio communication system according to claim 13, wherein said data input means respectively inputs normalized symbols of said normalized symbol sequence assumed symbol sequence, wherefrom said largest correlation value is derived, when a first differential value between said largest correlation value calculated based on said normalized symbol sequence and said assumed symbol sequence and a total number of reception symbols of said reception symbol sequence is larger than a predetermined reference value.

15. The radio communication system according to claim 14, wherein said decoding means restores said identification information based on said assumed symbol sequence, wherefrom said largest correlation value is derived, when said first differential value is larger than said predetermined reference value, and when a second differential value between said largest correlation value and a second largest correlation value is larger than said predetermined reference value.

* * * * *